US011462938B2

(12) United States Patent
Nakamori

(10) Patent No.: US 11,462,938 B2
(45) Date of Patent: Oct. 4, 2022

(54) UNINTERRUPTIBLE POWER SUPPLY SYSTEM

(71) Applicant: TOSHIBA MITSUBISHI-ELECTRIC INDUSTRIAL SYSTEMS CORPORATION, Chuo-ku (JP)

(72) Inventor: Toshiki Nakamori, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 17/421,489

(22) PCT Filed: Sep. 5, 2019

(86) PCT No.: PCT/JP2019/035052
§ 371 (c)(1),
(2) Date: Jul. 8, 2021

(87) PCT Pub. No.: WO2021/044599
PCT Pub. Date: Mar. 11, 2021

(65) Prior Publication Data
US 2022/0069616 A1    Mar. 3, 2022

(51) Int. Cl.
*H02J 9/06* (2006.01)
*H02M 7/5387* (2007.01)
(Continued)

(52) U.S. Cl.
CPC .............. *H02J 9/062* (2013.01); *H02M 3/158* (2013.01); *H02M 7/219* (2013.01); *H02M 7/5387* (2013.01)

(58) Field of Classification Search
CPC ............ H02J 9/062; H02J 9/06; H02M 3/158; H02M 7/219; H02M 7/5387
See application file for complete search history.

(56) References Cited

U.S. PATENT DOCUMENTS

2005/0213272 A1    9/2005  Kobayashi
2012/0235480 A1*   9/2012  Kim .................. H02J 9/062
                                                  307/18
(Continued)

FOREIGN PATENT DOCUMENTS

EP    2 569 845 B1    8/2016
JP    2004-173388 A   6/2004
(Continued)

OTHER PUBLICATIONS

International Search Report dated Nov. 19, 2019 in PCT/JP2019/035052 filed on Sep. 5, 2019, 2 pages.
(Continued)

*Primary Examiner* — Toan T Vu
(74) *Attorney, Agent, or Firm* — Oblon, McClelland, Maier & Neustadt, L.L.P.

(57) ABSTRACT

A master controller controls a plurality of uninterruptible power supply apparatuses each including a slave controller and detection circuits that detect at least a DC input voltage, an AC output voltage, and an output current of an inverter. The master controller generates a first voltage command value and a second voltage command value common to the plurality of uninterruptible power supply apparatuses based on detection values from the detection circuits transmitted from the slave controller of each of the uninterruptible power supply apparatuses. The master controller transmits the generated first and second voltage command values to the slave controller of each of the uninterruptible power supply apparatuses. The slave controller generates a first control signal for controlling a converter in accordance with the received first voltage command value. The slave controller generates a second control signal for controlling the inverter in accordance with the received second voltage command value.

14 Claims, 9 Drawing Sheets

(51) Int. Cl.
*H02M 7/219* (2006.01)
*H02M 3/158* (2006.01)

(56) References Cited

U.S. PATENT DOCUMENTS

| | | | |
|---|---|---|---|
| 2015/0207362 A1 | 7/2015 | Ohnishi et al. | |
| 2018/0152046 A1* | 5/2018 | Toyoda | H02J 9/062 |

FOREIGN PATENT DOCUMENTS

| | | |
|---|---|---|
| JP | 2005-278257 A | 10/2005 |
| JP | 2006-320149 A | 11/2006 |
| JP | 2007-228666 A | 9/2007 |
| JP | 2009-142078 A | 6/2009 |
| JP | 2009-303349 A | 12/2009 |
| JP | 2010-172105 A | 8/2010 |
| JP | 2013-512650 A | 4/2013 |
| JP | 2013-219958 A | 10/2013 |
| JP | 2017-158264 A | 9/2017 |
| JP | 2018-182872 A | 11/2018 |
| JP | 2019-32780 A | 2/2019 |
| WO | WO 2014/016919 A1 | 1/2014 |
| WO | WO2019128840 * | 7/2019 |

OTHER PUBLICATIONS

Office Action dated Apr. 21, 2021 in corresponding Japanese Patent Application No. 2020-508411 (with English Translation), 15 pages.
Written Opinion of International Search Report dated Nov. 19, 2019 in PCT/JP2019/035052 (with English Translation), 14 pages.
Japanese Office Action dated Nov. 30, 2021 in Japanese Patent Application No. 2020-508411 (with English translation), 17 pages.
Office Action dated Apr. 11, 2022, in corresponding Indian Patent Application No. 202117033580 (with English Translation), 5 pages.

* cited by examiner

UNINTERRUPTIBLE POWER SUPPLY SYSTEM

TECHNICAL FIELD

This invention relates to an uninterruptible power supply system.

BACKGROUND ART

Japanese Patent Laying-Open No. 2009-142078 (PTL 1) discloses an uninterruptible power supply apparatus including a plurality of power supply units, a main control unit provided in common to the plurality of power supply units, and a unit control device provided individually for each power supply unit. In this uninterruptible power supply apparatus, a main control device generates a gate pulse that operates a power conversion apparatus of each power supply unit, only for one unit. The unit control device of each power supply unit corrects imbalance in output current from the power supply unit by adjusting the gate pulse based on current information of the power supply unit.

CITATION LIST

Patent Literature

PTL 1: Japanese Patent Laying-Open No. 2009-142078

SUMMARY OF INVENTION

Technical Problem

According to the uninterruptible power supply apparatus described in PTL 1, it is not necessary to provide a highly functional and expensive CPU in a power supply unit. Therefore, while increase in cost is suppressed, a capacity of the uninterruptible power supply apparatus can be changed.

In transmission of a gate pulse to the unit control device of each power supply unit from the main control device, however, noise may be superimposed on the gate pulse. In this case, the unit control device operates the power conversion apparatus of each power supply unit with the gate pulse on which noise is superimposed, which may lead to concern about the possibility of a malfunction of each power supply unit.

The present invention was made to solve such problems, and an object of the present invention is to provide an uninterruptible power supply system that allows a plurality of uninterruptible power supply apparatuses connected in parallel to a load to operate in a stable manner.

Solution to Problem

In one aspect of the present invention, an uninterruptible power supply system includes a plurality of uninterruptible power supply apparatuses and a master controller. The plurality of uninterruptible power supply apparatuses are connected in parallel to a load. The master controller controls the plurality of uninterruptible power supply apparatuses. Each of the plurality of uninterruptible power supply apparatuses includes a converter, an inverter, a detection circuit, and a slave controller. The converter converts alternating-current (AC) power supplied from an AC power supply to direct-current (DC) power. The inverter converts DC power supplied from the converter or a power storage device to AC power and supplies AC power to the load. The detection circuit detects at least a DC input voltage to the inverter, an AC output voltage from the inverter, and an output current from the inverter. The slave controller is communicatively connected to the master controller and controls the converter and the inverter. The master controller generates a first voltage command value and a second voltage command value common to the plurality of uninterruptible power supply apparatuses based on a detection value from the detection circuit transmitted from the slave controller of each of the plurality of uninterruptible power supply apparatuses. The master controller transmits the generated first and second voltage command values to the slave controller of each of the plurality of uninterruptible power supply apparatuses. The slave controller generates a first control signal for controlling the converter in accordance with the received first voltage command value. The slave controller generates a second control signal for controlling the inverter in accordance with the received second voltage command value.

Advantageous Effects of Invention

According to this invention, an uninterruptible power supply system that allows a plurality of uninterruptible power supply apparatuses connected in parallel to a load to operate in a stable manner can be provided.

DESCRIPTION OF EMBODIMENTS

Figure 1:
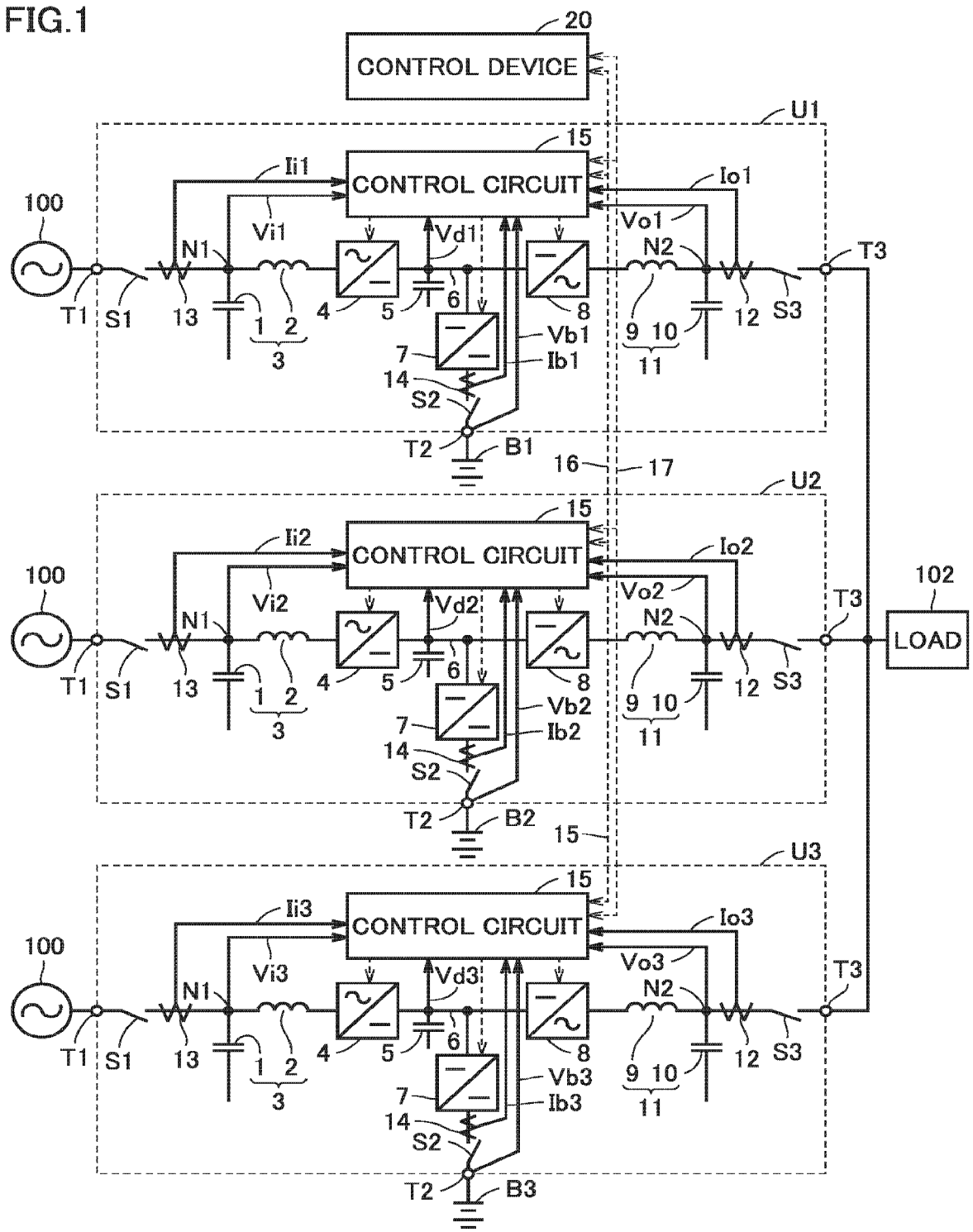
FIG. 1 is a circuit block diagram showing an overall configuration of an uninterruptible power supply system according to an embodiment.

An embodiment of this invention will be described in detail below with reference to the drawings. The same or corresponding elements in the drawings have the same reference characters allotted below and description thereof will not be repeated in principle.

<Overall Configuration of Uninterruptible Power Supply System>

FIG. 1 is a circuit block diagram showing an overall configuration of an uninterruptible power supply system according to an embodiment. Referring to FIG. 1, the uninterruptible power supply system includes a plurality of (three in FIG. 1) uninterruptible power supply apparatuses U1 to U3, a control device 20, and a plurality of batteries B1 to B3. In the description below, the plurality of uninterruptible power supply apparatuses U1 to U3 may collectively be referred to as an "uninterruptible power supply apparatus U" and the plurality of batteries B1 to B3 may collectively be referred to as a "battery B."

Each of uninterruptible power supply apparatuses U1 to U3 includes an input terminal T1, a battery terminal T2, and an output terminal T3. Input terminal T1 receives AC power at a commercial frequency from a commercial AC power supply 100. Though the uninterruptible power supply system actually receives three-phase AC power (U-phase AC power, V-phase AC power, and W-phase AC power) from commercial AC power supply 100, FIG. 1 shows only a circuit of one phase for the sake of brevity of the drawings and description.

Uninterruptible power supply apparatuses U1 to U3 have battery terminals T2 connected to batteries (power storage devices) B1 to B3, respectively. Each of batteries B1 to B3 stores DC power. A capacitor instead of battery B may be connected to battery terminal T2.

Output terminal T3 is connected to a load 102. Load 102 is driven with AC power. Uninterruptible power supply apparatuses U1 to U3 are connected in parallel to load 102. While the uninterruptible power supply system is normally operating, uninterruptible power supply apparatuses U1 to U3 are set to an operating state and AC power at the commercial frequency is supplied from uninterruptible power supply apparatuses U1 to U3 to load 102. Uninterruptible power supply apparatuses (for example, U1 and U2) in appropriate number (for example, two) necessary for operation of load 102 among uninterruptible power supply apparatuses U1 to U3 may be set to the operating state, whereas a remaining uninterruptible power supply apparatus (U3 in this case) may be set to a stand-by state.

Each of uninterruptible power supply apparatuses U1 to U3 further includes switches S1 to S3, capacitors 1, 5, and 10, reactors 2 and 9, a converter 4, a DC line 6, a bidirectional chopper 7, an inverter 8, current detectors 12 and 13, and a control circuit 15.

Switch S1 and reactor 2 are connected in series between input terminal T1 and an input node of converter 4. Capacitor 1 is connected to a node N1 between switch S1 and reactor 2. Switch S1 is turned on (conducting) when corresponding uninterruptible power supply apparatus U is set to the operating state and turned off (non-conducting) when corresponding uninterruptible power supply apparatus U is set to the stand-by state. An instantaneous value of an AC input voltage Vi that appears at node N1 is detected by control circuit 15. Whether or not a power failure has occurred is determined based on the instantaneous value of AC input voltage Vi. Current detector 13 detects an instantaneous value of a current (which is also referred to as an input current below) Ii that flows from input terminal T1 (that is, commercial AC power supply 100) through switch S1 to node N1 and provides a signal Ii indicating a detection value thereof to control circuit 15.

Capacitor 1 and reactor 2 implement an AC input filter 3. AC input filter 3 is a low-pass filter, which allows passage of AC power at the commercial frequency from commercial AC power supply 100 to converter 4 and prevents transmission of a signal at a switching frequency generated in converter 4 to commercial AC power supply 100.

Converter 4 is controlled by control circuit 15. During a normal operation in which AC power is supplied from commercial AC power supply 100, converter 4 converts AC power to DC power and provides DC power to DC line 6. During a power failure in which supply of AC power from commercial AC power supply 100 has been suspended, the operation of converter 4 is stopped. An output voltage from converter 4 is controllable to a desired value.

Capacitor 5 is connected to DC line 6 and smoothens a voltage of DC line 6. An instantaneous value of a DC voltage Vd that appears on DC line 6 is detected by control circuit 15. DC line 6 is connected to a high-voltage side node of bidirectional chopper 7 and bidirectional chopper 7 has a low-voltage side node connected to battery terminal T2 with switch S2 being interposed.

Switch S2 is turned on while corresponding uninterruptible power supply apparatus U is being used and turned off during maintenance of corresponding uninterruptible power supply apparatus U and corresponding battery B. An instantaneous value of a voltage Vb across terminals of battery B that appears at battery terminal T2 is detected by control circuit 15. Current detector 14 detects an instantaneous value of a current (which is also referred to as a battery current below) Ib that flows from bidirectional chopper 7 through switch S2 to battery terminal T2 (that is, battery B) and provides a signal Ib indicating a detection value thereof to control circuit 15.

Bidirectional chopper 7 is controlled by control circuit 15. During the normal operation in which AC power is supplied from commercial AC power supply 100, bidirectional chopper 7 down-converts a DC voltage Vd generated by converter 4 and provides the down-converted DC voltage to battery B. When DC power in battery B is supplied to inverter 8, bidirectional chopper 7 up-converts voltage (which is also referred to as a battery voltage below) Vb across terminals of battery B and provides the up-converted voltage to DC line 6. DC line 6 is connected to an input node of inverter 8.

Inverter 8 is controlled by control circuit 15. Inverter 8 converts DC power supplied from converter 4 or bidirectional chopper 7 through DC line 6 to AC power at the commercial frequency and provides AC power. In other words, inverter 8 converts DC power supplied from converter 4 through DC line 6 to AC power during the normal operation and converts DC power supplied from battery B through bidirectional chopper 7 to AC power during the power failure. An output voltage from inverter 8 is controllable to a desired value.

Inverter 8 has an output node connected to one terminal of reactor 9 and reactor 9 has the other terminal (a node N2) connected to output terminal T3 with switch S3 being interposed. Capacitor 10 is connected to node N2. An instantaneous value of an AC output voltage Vo that appears at node N2 is detected by control circuit 15. Current detector 12 detects an instantaneous value of a current (which is also referred to as an output current below) Io that flows from node N2 through switch S3 to output terminal T3 (that is, load 102) and provides a signal Io indicating a detection value thereof to control circuit 15.

Reactor 9 and capacitor 10 implement an AC output filter 11. AC output filter 11 is a low-pass filter, which allows passage of AC power at the commercial frequency generated in inverter 8 to output terminal T3 and prevents transmission of a signal at a switching frequency generated in inverter 8 to output terminal T3. Switch S3 is controlled by control circuit 15, and turned on when corresponding uninterruptible power supply apparatus U is being used and turned off during maintenance of corresponding uninterruptible power supply apparatus U.

Figure 2:
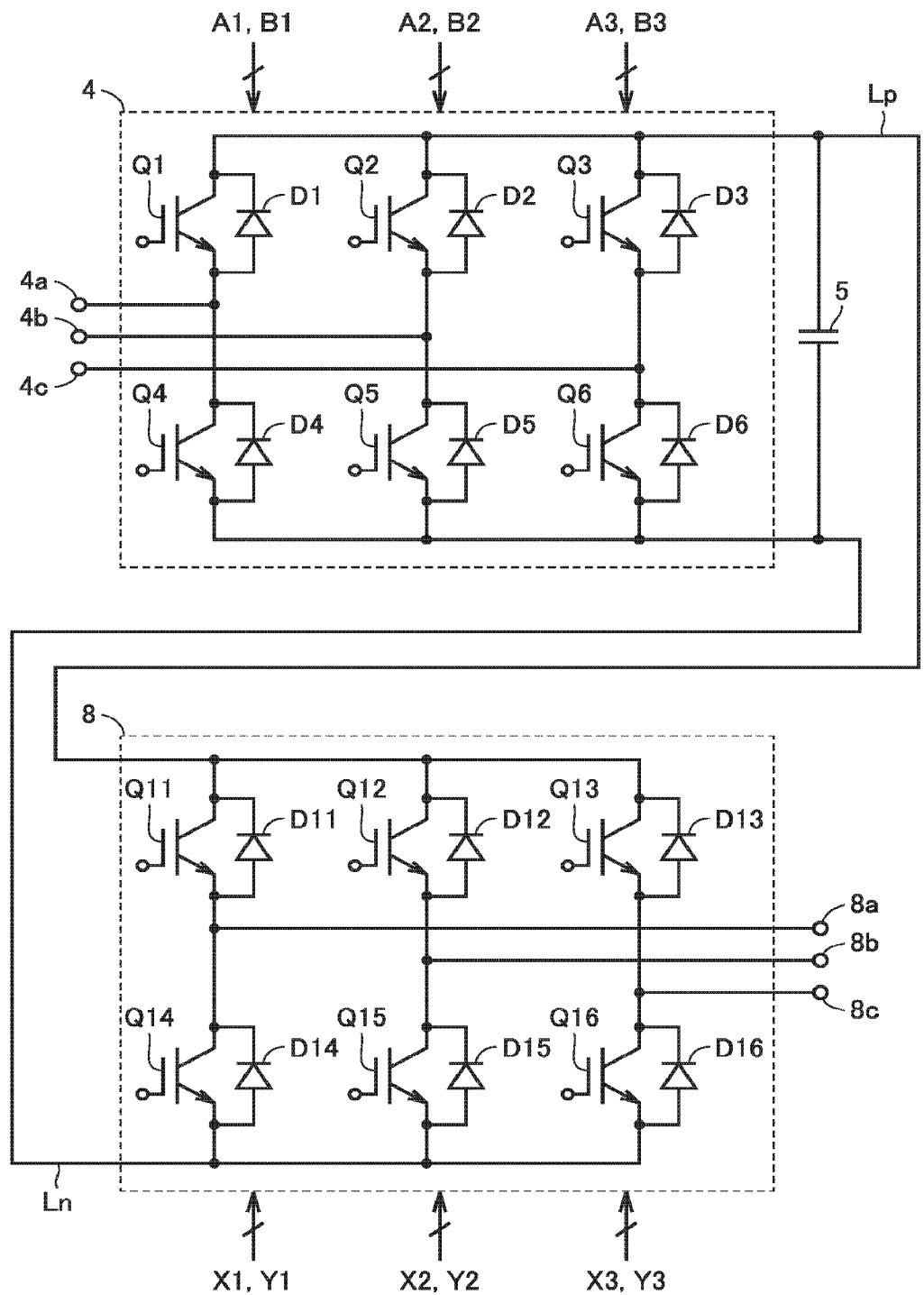
FIG. 2 is a circuit diagram showing an exemplary configuration of a converter and an inverter.

Converter 4, bidirectional chopper 7, and inverter 8 are each made up of a semiconductor switching element. For example, an insulated gate bipolar transistor (IGBT) is applied as the semiconductor switching element. Pulse width modulation (PWM) control can be applied as a mode of control of the semiconductor switching element. FIG. 2 is a circuit diagram showing an exemplary configuration of converter 4 and inverter 8.

Referring to FIG. 2, converter 4 includes IGBTs Q1 to Q6 and diodes D1 to D6. IGBTs Q1 to Q3 have collectors connected to a DC positive bus Lp together and have emitters connected to input nodes 4a, 4b, and 4c, respectively.

Input nodes 4a, 4b, and 4c are connected to the other terminals of not-shown reactors 2a, 2b, and 2c, respectively. IGBTs Q4 to Q6 have collectors connected to input nodes 4a, 4b, and 4c, respectively, and have emitters connected to a DC negative bus Ln together. Diodes D1 to D6 are connected in anti-parallel to IGBTs Q1 to Q6, respectively.

IGBTs Q1 and Q4 are controlled by gate signals A1 and B1, respectively, IGBTs Q2 and Q5 are controlled by gate signals A2 and B2, respectively, and IGBTs Q3 and Q6 are controlled by gate signals A3 and B3, respectively. Gate signals B1, B2, and B3 are inverted signals of gate signals A1, A2, and A3, respectively.

IGBTs Q1 to Q3 are turned on when gate signals A1 to A3 are set to the H level, respectively, and turned off when gate signals A1 to A3 are set to the L level, respectively. IGBTs Q4 to Q6 are turned on when gate signals B1 to B3 are set to the H level, respectively, and turned off when gate signals B1 to B3 are set to the L level, respectively.

Each of gate signals A1, B1, A2, B2, A3, and B3 is a pulse signal train and a PWM signal. Basically, there is a phase difference of 120 degrees among gate signals A1 and B1, gate signals A2 and B2, and gate signals A3 and B3. Gate signals A1, B1, A2, B2, A3, and B3 are generated by control circuit 15. A three-phase AC voltage provided to input nodes 4a to 4c can be converted to DC voltage Vd by turning on and off each of IGBTs Q1 to Q6 at prescribed timing with gate signals A1, B1, A2, B2, A3, and B3 and adjusting a duration of on of each of IGBTs Q1 to Q6.

Inverter 8 includes IGBTs Q11 to Q16 and diodes D11 to D16. IGBTs Q11 to Q13 have collectors connected to DC positive bus Lp together and have emitters connected to output nodes 8a, 8b, and 8c, respectively.

Output nodes 8a, 8b, and 8c are connected to one terminals of not-shown reactors 9a, 9b, and 9c, respectively. IGBTs Q14 to Q16 have collectors connected to output nodes 8a, 8b, and 8c, respectively, and have emitters connected to DC negative bus Ln together. Diodes D11 to D16 are connected in anti-parallel to IGBTs Q11 to Q16, respectively.

IGBTs Q11 and Q14 are controlled by gate signals X1 and Y1, respectively, IGBTs Q12 and Q15 are controlled by gate signals X2 and Y2, respectively, and IGBTs Q13 and Q16 are controlled by gate signals X3 and Y3, respectively. Gate signals Y1, Y2, and Y3 are inverted signals of gate signals X1, X2, and X3, respectively.

IGBTs Q11 to Q13 are turned on when gate signals X1 to X3 are set to the H level, respectively, and turned off when gate signals X1 to X3 are set to the L level, respectively. IGBTs Q14 to Q16 are turned on when gate signals Y1 to Y3 are set to the H level, respectively, and turned off when gate signals Y1 to Y3 are set to the L level, respectively.

Each of gate signals X1, Y1, X2, Y2, X3, and Y3 is a pulse signal train and a PWM signal. Basically, there is a phase difference of 120 degrees among gate signals X1 and Y1, gate signals X2 and Y2, and gate signals X3 and Y3. Gate signals X1, Y1, X2, Y2, X3, and Y3 are generated by control circuit 15. DC voltage Vd between DC buses Lp and Ln can be converted to three-phase AC voltage Vo by turning on and off each of IGBTs Q11 to Q16 at prescribed timing with gate signals X1, Y1, X2, Y2, X3, and Y3 and adjusting a duration of on of each of IGBTs Q11 to Q16.

Figure 3:
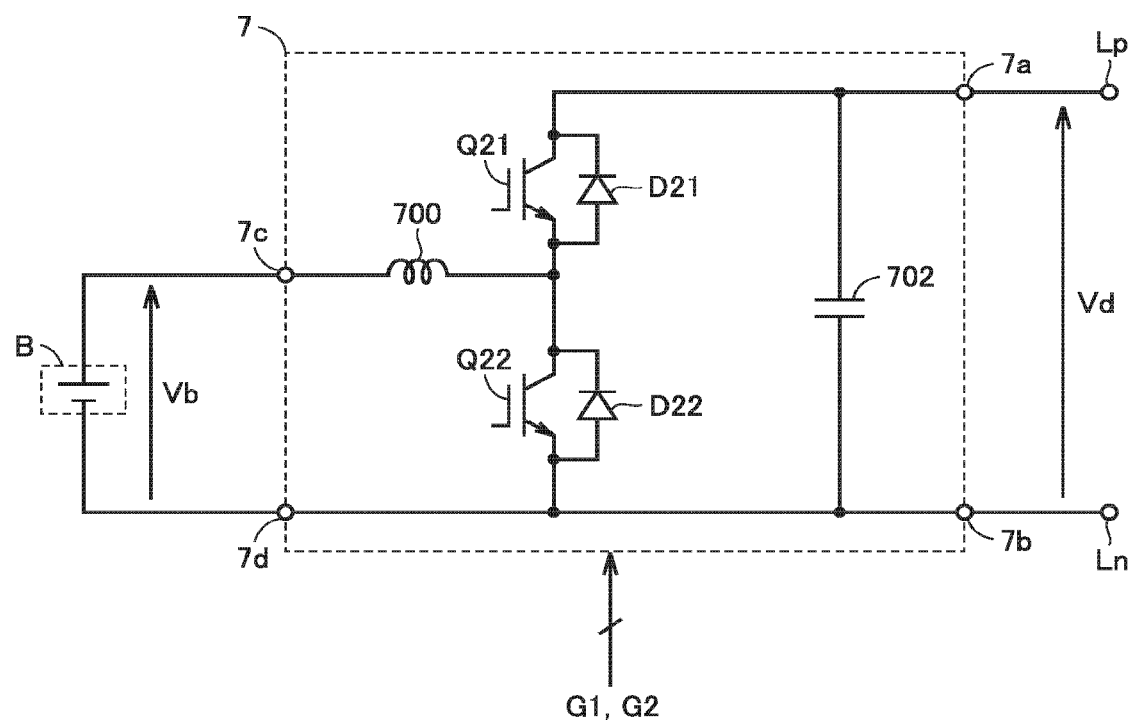
FIG. 3 is a circuit diagram showing an exemplary configuration of a bidirectional chopper.

FIG. 3 is a circuit diagram showing an exemplary configuration of bidirectional chopper 7. Referring to FIG. 3, bidirectional chopper 7 includes IGBTs Q21 and Q22, diodes D21 and D22, a reactor 700, and a capacitor 702.

IGBT Q21 has a collector connected to a high-voltage side node 7a and has an emitter connected to a low-voltage side node 7c with reactor 700 being interposed and to a collector of IGBT Q22. IGBT Q22 has an emitter connected to a high-voltage side node 7b and a low-voltage side node 7d. Diodes D21 and D22 are connected in anti-parallel to IGBTs Q21 and Q22, respectively. The capacitor is connected between high-voltage side nodes 7a and 7b and stabilizes DC voltage Vd between high-voltage side nodes 7a and 7b.

IGBT Q21 is controlled by a gate signal G1 from control circuit 15. When gate signal G1 is set to the H level, IGBT Q21 is turned on, and when gate signal G1 is set to the L level, IGBT Q21 is turned off. IGBT Q22 is controlled by a gate signal G2 from control circuit 15. When gate signal G2 is set to the H level, IGBT Q22 is turned on, and when gate signal G2 is set to the L level, IGBT Q22 is turned off. Each of gate signals G1 and G2 is a pulse signal train and a PWM signal. Gate signal G1 is an inverted signal of gate signal G2.

Referring back to FIG. 1, control circuit 15 controls the entire corresponding uninterruptible power supply apparatus U (which is also referred to as a corresponding uninterruptible power supply apparatus below) based on a signal from control device 20, AC input voltage Vi, DC voltage Vd, battery voltage Vb, AC output voltage Vo, input current Ii, battery current Ib, and output current Io. Specifically, during the normal operation in which AC power is supplied from commercial AC power supply 100, control circuit 15 controls converter 4 and inverter 8 in synchronization with a phase of AC input voltage Vi.

During the normal operation, control circuit 15 controls converter 4 such that DC voltage Vd attains to a reference voltage Vdr which is a target value of DC voltage Vd, and during the power failure in which supply of AC power from commercial AC power supply 100 has been suspended, control circuit 15 stops the operation of converter 4. Reference voltage Vdr corresponds to a "first target value" or a "third target value."

Furthermore, during the normal operation, control circuit 15 controls bidirectional chopper 7 such that battery voltage Vb attains to a reference voltage Vbr which is a target value of battery voltage Vb, and during the power failure, control circuit 15 controls bidirectional chopper 7 such that DC voltage Vd attains to reference voltage Vdr.

Control circuit 15 is connected to control device 20 and control circuit 15 of another uninterruptible power supply apparatus U through a communication cable 16. Control circuit 15 of each uninterruptible power supply apparatus U and control device 20 supply and receive data through communication cable 16. A serial communication mode is applied as a mode of communication between control device 20 and control circuit 15. Serial communication may be wired or wireless communication. Control device 20 controls converter 4 and inverter 8 of each uninterruptible power supply apparatus U such that currents allocated to the plurality of uninterruptible power supply apparatuses U1 to U3 are equal to one another.

Control device 20 controls the entire uninterruptible power supply system based on signals from the plurality of uninterruptible power supply apparatuses U1 to U3. Control device 20 corresponds to one embodiment of a "master controller" that controls the plurality of uninterruptible power supply apparatuses U1 to U3 in a centralized manner. Control circuit 15 of uninterruptible power supply apparatus U corresponds to one embodiment of a "slave controller" that controls corresponding uninterruptible power supply apparatus U (corresponding uninterruptible power supply apparatus) in accordance with a control command provided from control device 20.

Specifically, control device 20 receives signals indicating detection values of input current Ii, output current Io, and battery current Ib and detection values of AC input voltage Vi, DC voltage Vd, battery voltage Vb, and AC output voltage Vo from each of the plurality of uninterruptible power supply apparatuses U1 to U3 through communication cable 16. Control device 20 generates a voltage command for each uninterruptible power supply apparatus U based on the received signal. Control device 20 transmits the generated voltage command to control circuits 15 of the plurality of uninterruptible power supply apparatuses U1 to U3 through communication cable 16.

When control circuit 15 of uninterruptible power supply apparatus U receives the voltage command from control device 20, it turns on corresponding switch S1 and controls operations of corresponding converter 4, bidirectional chopper 7, and inverter 8 in accordance with the voltage command.

<Control Configuration of Uninterruptible Power Supply System>

Figure 4:
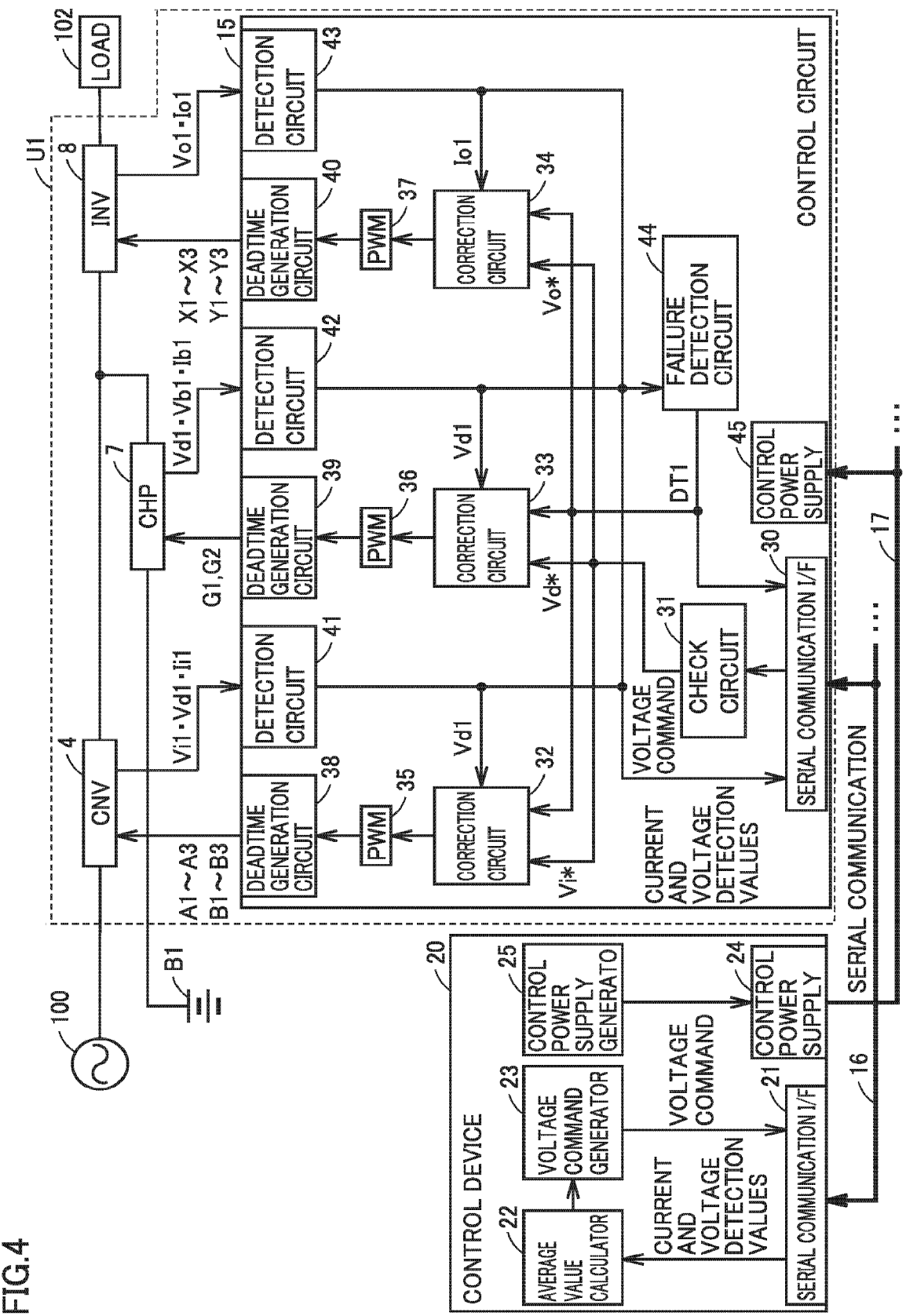
FIG. 4 is a functional block diagram illustrating an exemplary control configuration of a control device and a control circuit.

FIG. 4 is a functional block diagram illustrating an exemplary control configuration of control device 20 and control circuit 15. Control circuit 15 of uninterruptible power supply apparatus U1, control circuit 15 of uninterruptible power supply apparatus U2, and control circuit 15 of uninterruptible power supply apparatus U3 are identical in basic configuration. FIG. 4 representatively shows control circuit 15 of uninterruptible power supply apparatus U1.

Referring to FIG. 4, control device 20 and control circuits 15 of the plurality of uninterruptible power supply apparatuses U1 to U3 are connected through communication cable 16 to be able to bidirectionally communicate with one another. Communication cable 16 is configured to bidirectionally transfer data in serial communication.

(Configuration of Control Device 20)

Control device 20 includes a serial communication interface (I/F) 21, an average value calculator 22, a voltage command generator 23, a control power supply 24, and a control power supply generator 25. Each functional block of control device 20 is implemented, for example, by software processing and/or hardware processing by a microcomputer that implements control device 20.

Serial communication I/F 21 is a communication interface for exchanging various types of data between control device 20 and control circuit 15 by serial communication through communication cable 16. Serial communication I/F 21 includes a serial/parallel converter (S/P) that converts serial data provided from communication cable 16 to a plurality of pieces of parallel data and a parallel/serial converter (P/S) that converts parallel data provided from control device 20 to serial data.

In the exemplary configuration in FIG. 4, serial communication I/F 21 receives serial data indicating current and voltage detection values from control circuit 15 of each of the plurality of uninterruptible power supply apparatuses U1 to U3 through communication cable 16. Serial data indicating the current and voltage detection values is in such a form that detection values of input current Ii, output current Io, and battery current Ib and detection values of AC input voltage Vi, DC voltage Vd, battery voltage Vb, and AC output voltage Vo are aligned on a time-series basis. Serial communication I/F 21 converts received serial data to parallel data indicating current and voltage detection values and provides the generated parallel data to average value calculator 22.

Average value calculator 22 calculates an average value of the current and voltage detection values among the plurality of uninterruptible power supply apparatuses U1 to U3. Specifically, average value calculator 22 calculates an average value (which is also referred to as an AC input voltage average value below) Via of an AC input voltage Vi1 of uninterruptible power supply apparatus U1, an AC input voltage Vi2 of uninterruptible power supply apparatus U2, and an AC input voltage Vi3 of uninterruptible power supply apparatus U3. Average value calculator 22 calculates an average value (which is also referred to as a DC voltage average value below) Vda of a DC voltage Vd1 of uninterruptible power supply apparatus U1, a DC voltage Vd2 of uninterruptible power supply apparatus U2, and a DC voltage Vd3 of uninterruptible power supply apparatus U3. Average value calculator 22 calculates an average value (which is also referred to as a battery voltage average value below) Vba of a battery voltage Vb1 of uninterruptible power supply apparatus U1, a battery voltage Vb2 of uninterruptible power supply apparatus U2, and a battery voltage Vb3 of uninterruptible power supply apparatus U3. Average value calculator 22 calculates an average value (which is also referred to as an AC output voltage average value below) Voa of an AC output voltage Vo1 of uninterruptible power supply apparatus U1, an AC output voltage Vo2 of uninterruptible power supply apparatus U2, and an AC output voltage Vo3 of uninterruptible power supply apparatus U3.

Average value calculator 22 calculates an average value (which is also referred to as an input current average value below) Iia of an input current Ii1 of uninterruptible power supply apparatus U1, an input current Ii2 of uninterruptible power supply apparatus U2, and an input current Ii3 of uninterruptible power supply apparatus U3. Average value calculator 22 calculates an average value (which is also referred to as a battery current average value below) Iba of a battery current Ib1 of uninterruptible power supply apparatus U1, a battery current Ib2 of uninterruptible power supply apparatus U2, and a battery current Ib3 of uninterruptible power supply apparatus U3. Average value calculator 22 calculates an average value (which is also referred to as an output current average value below) Ioa of an output current Io1 of uninterruptible power supply apparatus U1, an output current Io2 of uninterruptible power supply apparatus U2, and an output current Io3 of uninterruptible power supply apparatus U3.

Figure 5:
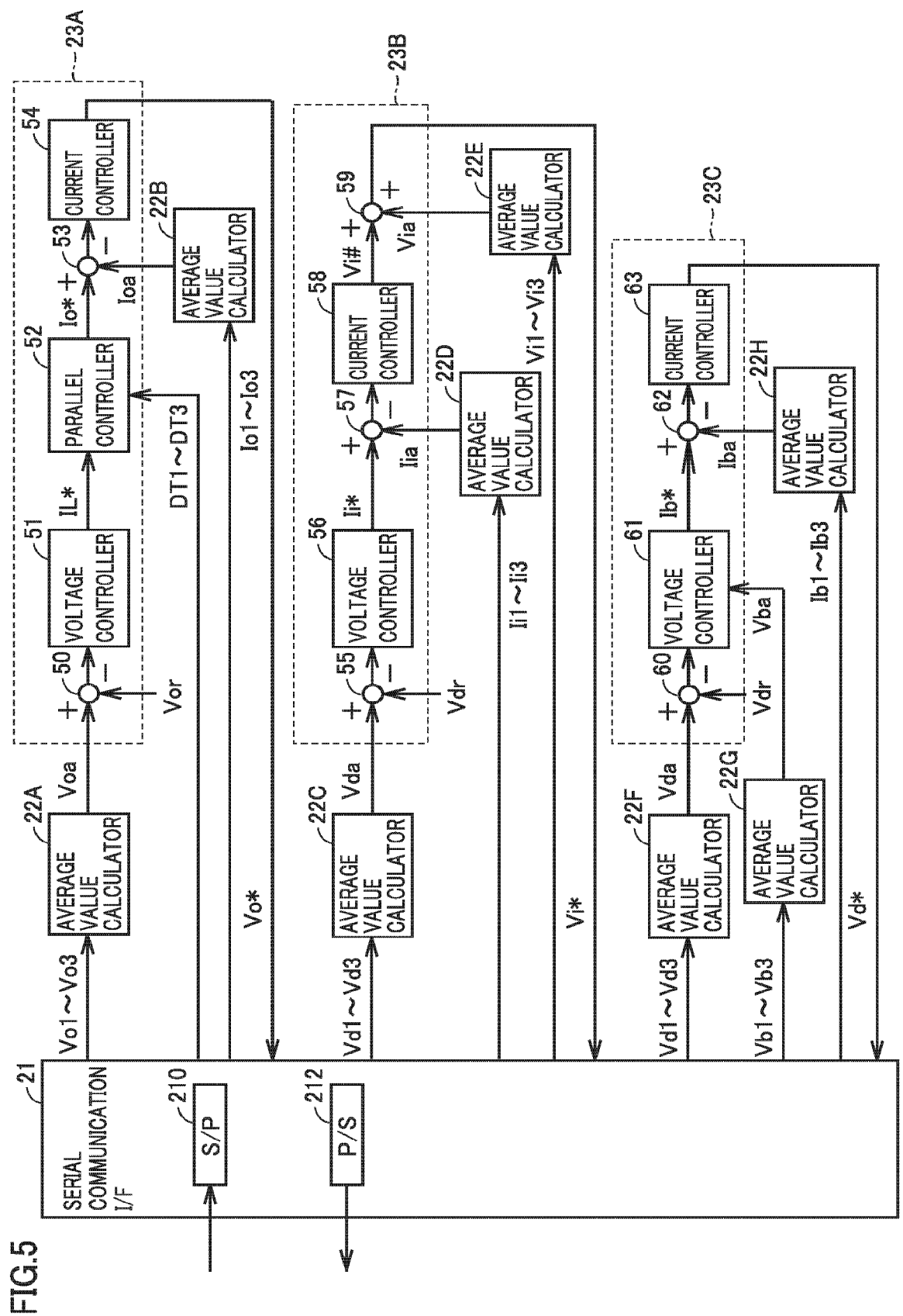
FIG. 5 is a functional block diagram illustrating an exemplary configuration of a voltage command generator.

Voltage command generator 23 generates a voltage command for uninterruptible power supply apparatus U based on the average value calculated by average value calculator 22. FIG. 5 is a functional block diagram illustrating an exemplary configuration of voltage command generator 23.

Referring to FIG. 5, voltage command generator 23 includes a voltage command generator 23A that generates a voltage command value for controlling inverter 8, a voltage command generator 23B that generates a voltage command value for controlling converter 4, and a voltage command generator 23C that generates a voltage command value for controlling bidirectional chopper 7. Average value calculators 22A to 22H in the figure implement average value calculator 22 in FIG. 2. Serial communication I/F 21 includes an S/P 210 and a P/S 212.

Voltage command generator 23A includes subtractors 50 and 53, a voltage controller 51, a parallel controller 52, and a current controller 54. Subtractor 50 calculates a difference $\Delta Vo$ from a reference voltage Vor, of AC output voltage average value Voa calculated by average value calculator 22A ($\Delta Vo=Vor-Voa$). Reference voltage Vor is in synchronization with an AC output voltage from commercial AC power supply 100. Reference voltage Vor corresponds to a "second target value."

Voltage controller 51 generates a current command value IL* by performing control calculation for making difference $\Delta Vo$ smaller. Voltage controller 51 generates current command value IL*, for example, by proportional integral (PI) calculation. Current command value IL* corresponds to a command value for a current to be supplied to load 102.

Parallel controller 52 receives a failure detection signal DT generated by a failure detection circuit 44 (FIG. 4) contained in control circuit 15 of uninterruptible power supply apparatus U. Failure detection signal DT indicates whether or not corresponding uninterruptible power supply apparatus U has failed. A failure detection signal DT1 indicates whether or not uninterruptible power supply apparatus U1 has failed, a failure detection signal DT2 indicates whether or not uninterruptible power supply apparatus U2 has failed, and a failure detection signal DT3 indicates whether or not uninterruptible power supply apparatus U3 has failed. The configuration of failure detection circuit 44 will be described later.

Parallel controller 52 detects the number of normal uninterruptible power supply apparatuses U based on failure detection signals DT1 to DT3. Parallel controller 52 generates a current command value Io* by dividing current command value IL* by the number of normal uninterruptible power supply apparatuses U. Current command value Io* corresponds to a command value for output current Io from normal uninterruptible power supply apparatus U.

Subtractor 53 calculates a difference Mo from current command value Io*, of output current average value Ioa calculated by average value calculator 22B ($\Delta Io=Io*-Ioa$).

Current controller 54 generates a voltage command value Vo* by performing control calculation for making difference $\Delta Io$ smaller. Current controller 54 generates voltage command value Vo*, for example, by PI calculation. Voltage command value Vo* corresponds to a command value for AC output voltage Vo from inverter 8. Voltage command value Vo* defines a "second voltage command value." Current controller 54 provides generated voltage command value Vo* to P/S 212.

Voltage command generator 23B includes subtractors 55 and 57, a voltage controller 56, a current controller 58, and an adder 59. Subtractor 55 calculates a difference $\Delta Vd$ from reference voltage Vdr (the first target value), of DC voltage average value Vda calculated by average value calculator 22C ($\Delta Vd=Vdr-Vda$).

Voltage controller 56 generates a current command value Ii* by performing control calculation for making difference $\Delta Vd$ smaller. Voltage controller 56 generates current command value Ii*, for example, by PI calculation. Current command value Ii* corresponds to a command value for input current Ii to uninterruptible power supply apparatus U.

Subtractor 57 calculates a difference $\Delta Ii$ from current command value Ii*, of input current average value Iia calculated by average value calculator 22D ($\Delta Ii=Ii*-Iia$).

Current controller 58 generates a voltage command value Vi # by performing control calculation for making difference $\Delta Ii$ smaller. Current controller 54 generates voltage command value Vi #, for example, by PI calculation.

Adder 59 generates a voltage command value Vi* by adding AC input voltage average value Via calculated by average value calculator 22E to voltage command value Vi #. Voltage command value Vi* corresponds to a command value for AC input voltage Vi to converter 4. Voltage command value Vi* defines a "first voltage command value." Adder 59 provides generated voltage command value Vi* to P/S 212.

Voltage command generator 23C includes subtractors 60 and 62, a voltage controller 61, and a current controller 63. Subtractor 60 calculates difference $\Delta Vd$ from reference voltage Vdr (the third target value), of DC voltage average value Vda calculated by average value calculator 22F ($\Delta Vd=Vdr-Vda$).

Voltage controller 61 performs control calculation for making difference $\Delta Vd$ smaller. Voltage controller 61 generates a current command value Ib* based on a result of control calculation and battery voltage average value Vba calculated by average value calculator 22G. Voltage controller 61 generates current command value Ib*, for example, by PI calculation. Current command value Ib* corresponds to a command value for battery current Ib of uninterruptible power supply apparatus U.

Subtractor 62 calculates a difference Mb from current command value Ib*, of battery current average value Iba calculated by average value calculator 22H ($\Delta Ib=Ib*-Iba$).

Current controller 63 generates a voltage command value Vd* by performing control calculation for making difference $\Delta Ib$ smaller. Current controller 63 generates voltage command value Vd*, for example, by PI calculation. Voltage command value Vd* corresponds to a command value for DC voltage Vd of uninterruptible power supply apparatus U. Voltage command value Vd* defines a "third voltage command value." Current controller 63 provides generated voltage command value Vd* to P/S 212.

P/S 212 converts voltage command values Vo*, Vi*, and Vd* generated by voltage command generators 23A to 23C, respectively, to serial data and provides the serial data to communication cable 16. Voltage command values Vo*, Vi*, and Vd* are transferred to control circuit 15 of uninterruptible power supply apparatus U through communication cable 16.

Referring back to FIG. 4, control power supply generator 25 generates control power supply 24 for driving the entire control device 20, based on an AC voltage provided from commercial AC power supply 100 at the time of start-up of the uninterruptible power supply system. During the power failure of commercial AC power supply 100, control power supply generator 25 generates control power supply 24 based on the AC output voltage. Control power supply 24 is connected to a control power supply 45 contained in each of the plurality of uninterruptible power supply apparatuses U1 to U3 through a power cable 17. Control power supply 45 drives the entire corresponding uninterruptible power supply apparatus U upon receiving supply of electric power from power cable 17.

(Configuration of Control Circuit 15)

Control circuit 15 of uninterruptible power supply apparatus U1 includes a serial communication I/F 30, a check circuit 31, correction circuits 32 to 34, PWM circuits 35 to 37, deadtime generation circuits 38 to 40, detection circuits 41 to 43, failure detection circuit 44, and control power supply 45. Each functional block of control circuit 15 is implemented, for example, by software processing and/or hardware processing by a microcomputer that implements control circuit 15.

Serial communication I/F 30 is a communication interface for exchange of various types of data between control circuit 15 of uninterruptible power supply apparatus U1, and control device 20 and control circuits 15 of other uninterruptible power supply apparatuses U2 and U3 by serial communication through communication cable 16. Serial communication I/F 30 includes an S/P and a P/S which are not shown.

In the exemplary configuration in FIG. 4, when serial communication I/F 30 receives serial data indicating a voltage command from control device 20 through communication cable 16, it converts the received serial data to parallel data indicating the voltage command and provides the parallel data to check circuit 31.

Detection circuit 41 transfers signals indicating detection values of AC input voltage Vi1, DC voltage Vd1, and input current Ii1 detected by the current detector and the voltage detector (not shown) provided in correspondence with converter 4 to serial communication I/F 30 and failure detection circuit 44.

Detection circuit 42 transfers signals indicating detection values of DC voltage Vd1, battery voltage Vb1, and battery current Ib1 detected by the current detector and the voltage detector (not shown) provided in correspondence with bidirectional chopper 7 to serial communication I/F 30 and failure detection circuit 44.

Detection circuit 43 transfers signals indicating detection values of AC output voltage Vo1 and output current Io1 detected by the current detector and the voltage detector (not shown) provided in correspondence with inverter 8 to serial communication I/F 30 and failure detection circuit 44. Detection circuits 41 to 43 correspond to one embodiment of the "detection circuit."

Serial communication I/F 30 converts parallel data indicating voltage and current detection values provided from detection circuits 41 to 43 to serial data and provides the generated serial data to communication cable 16.

Failure detection circuit 44 determines whether or not uninterruptible power supply apparatus U1 has failed based on the voltage and current detection values provided from detection circuits 41 to 43. For example, when at least one of the plurality of voltage detection values has exceeded an upper limit voltage set in advance or when at least one of the plurality of current detection values has exceeded an upper limit current set in advance, failure detection circuit 44 determines that uninterruptible power supply apparatus U1 has failed. When failure detection circuit 44 determines that uninterruptible power supply apparatus U1 has failed, it provides failure detection signal DT1 activated to the H level to correction circuits 32 to 34 and serial communication I/F 30. When failure detection circuit 44 determines that uninterruptible power supply apparatus U1 has not failed, it provides failure detection signal DT1 at the L level to correction circuits 32 to 34 and serial communication I/F 30. Serial communication I/F 30 converts failure detection signal DT1 to serial data and provides the serial data to communication cable 16. Failure detection signal DT1 is transmitted to control device 20 through communication cable 16.

Check circuit 31 is a circuit for checking whether or not a communication error has occurred in serial communication. Check circuit 31 can sense occurrence of a communication error with a known method such as parity check. When check circuit 31 senses no communication error, it transfers the received voltage command to correction circuits 32, 33, and 34. Specifically, check circuit 31 transfers voltage command value Vi* to correction circuit 32, transfers voltage command value Vd* to correction circuit 33, and transfers voltage command value Vo* to correction circuit 34.

When occurrence of a communication error is sensed, for example, when a part of serial data has been lost due to noise, check circuit 31 does not update the voltage command but holds a previous value of the voltage command.

When check circuit 31 senses a communication error continuously for a prescribed period, it determines that abnormality that disables serial communication with control device 20 has occurred. When abnormality in serial communication occurs, check circuit 31 disconnects corresponding uninterruptible power supply apparatus U from the uninterruptible power supply system by turning off switch S1 of corresponding uninterruptible power supply apparatus U. Furthermore, check circuit 31 deactivates converter 4, inverter 8, and bidirectional chopper 7 of corresponding uninterruptible power supply apparatus U.

Figure 6:
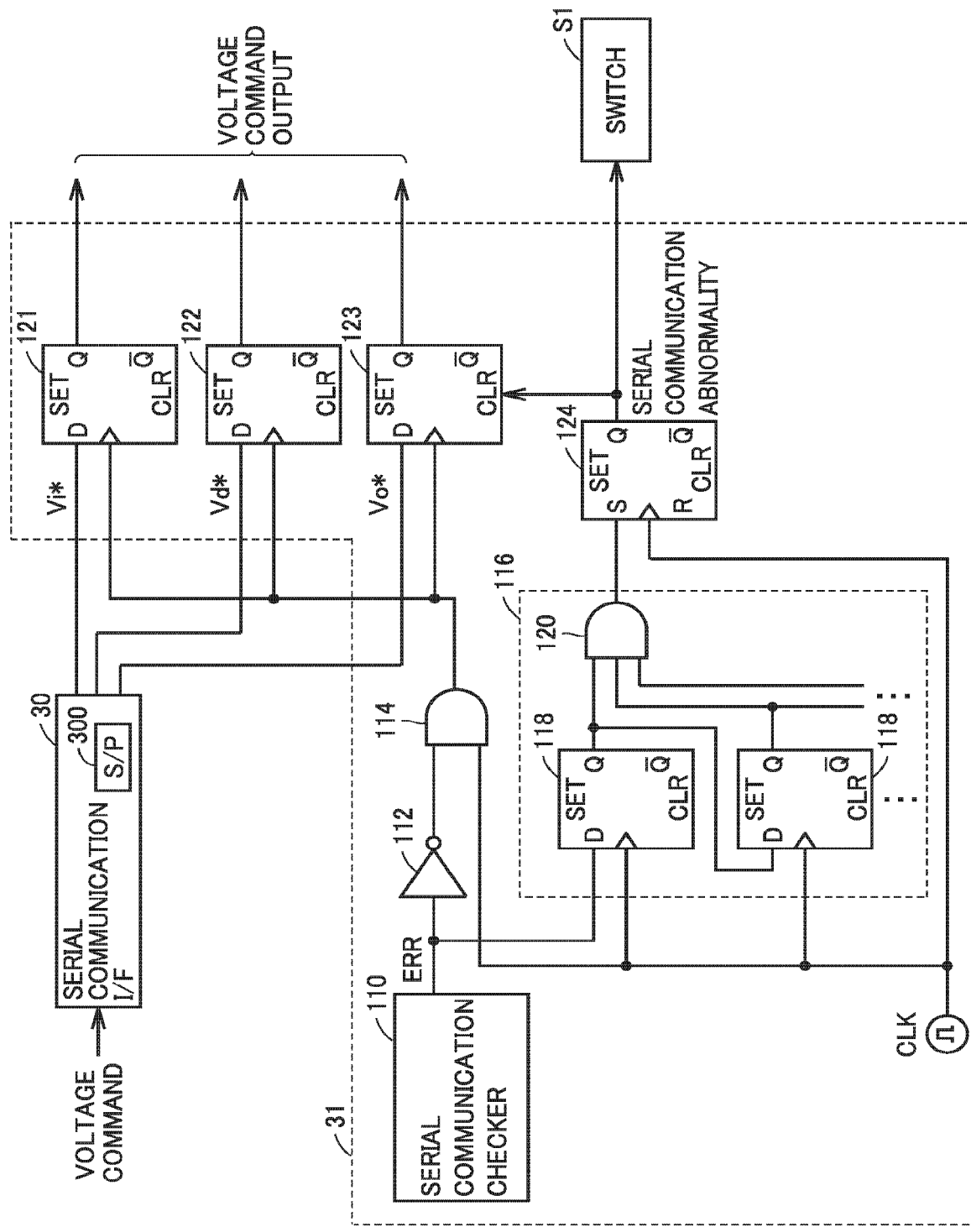
FIG. 6 is a functional block diagram illustrating an exemplary configuration of a check circuit.

FIG. 6 is a functional block diagram illustrating an exemplary configuration of check circuit 31. Referring to FIG. 6, check circuit 31 includes a serial communication checker 110, a logical NOT (NOT) circuit 112, a logical AND (AND) circuit 114, a shift register 116, D flip-flops (D-FF) 121, 122, and 123, and an RS flip-flop (RS-FF) 124.

Serial communication checker 110 checks whether or not a communication error has occurred with a known method such as parity check. When serial communication checker 110 senses occurrence of a communication error, it generates an error signal ERR activated to the H level. During the normal operation where no communication error is occurring, error signal ERR is maintained at the L level.

NOT circuit 112 provides a signal indicating a result of negation operation of error signal ERR from serial communication checker 110 to AND circuit 114. AND circuit 114 provides a signal indicating a result of logical AND operation of a clock CLK and a signal from NOT circuit 112. An output signal from AND circuit 114 matches with clock CLK when error signal ERR is at the L level, that is, when serial communication is normal. When error signal ERR is at the H level, that is, when a communication error occurs, an output signal from AND circuit 114 is fixed to the L level.

D-FF 121 receives voltage command value Vi* at an input terminal D and receives an output signal from AND circuit 114 at a clock terminal. D-FF 121 operates at the time of rise of the output signal from AND circuit 114 which is a clock input. In other words, D-FF 121 provides voltage command value Vi* to a set output terminal Q at the time of rise of the output signal from AND circuit 114. When the output signal from AND circuit 114 is at the L level, a set output is not varied.

Then, when serial communication is normal, D-FF 121 provides voltage command value Vi* at the time of rise of clock CLK. When a communication error occurs, clock CLK is fixed to the L level and hence D-FF 121 does not operate. Consequently, the set output from D-FF 121 is maintained at voltage command value Vi* immediately before occurrence of the communication error.

D-FF 122 receives voltage command value Vd* at input terminal D and receives an output signal from AND circuit 114 at a clock terminal. D-FF 122 provides voltage command value Vd* to set output terminal Q at the time of rise of the output signal from AND circuit 114. Therefore, when serial communication is normal, D-FF 122 provides voltage command value Vd* at the time of rise of clock CLK. When a communication error occurs, clock CLK is fixed to the L level and hence D-FF 122 does not operate. Consequently, the set output from D-FF 122 is maintained at voltage command value Vd* immediately before occurrence of the communication error.

D-FF 123 receives voltage command value Vo* at input terminal D and receives an output signal from AND circuit 114 at a clock terminal. D-FF 123 provides voltage command value Vo* to set output terminal Q at the time of rise of the output signal from AND circuit 114. Therefore, when serial communication is normal, D-FF 123 provides voltage command value Vo* at the time of rise of clock CLK. When a communication error occurs, clock CLK is fixed to the L level and hence D-FF 123 does not operate. Consequently, the set output from D-FF 123 is maintained at voltage command value Vo* immediately before occurrence of the communication error.

Shift register 116 includes a plurality of D-FFs 118 and an AND circuit 120. D-FF 118 shifts provided data to D-FF 118 in a subsequent stage each time clock CLK is provided. Shift register 116 provides a set output from each D-FF 118 together with a set output from D-FF 118 in a last stage. AND circuit 120 provides a signal indicating a result of logical AND operation of a plurality of set outputs.

Each D-FF 118 receives error signal ERR from serial communication checker 110 at input terminal D and receives clock CLK at a clock terminal. When error signal ERR is at the L level, the set output from each D-FF 118 is at the L level and hence an output signal from AND circuit 120 is also at the L level. When error signal ERR makes transition from the L level to the H level with occurrence of a communication error, the set output also makes transition from the L level to the H level sequentially from D-FF 118 in a preceding stage each time a clock input is provided. When the set outputs from all D-FFs 118 are at the H level at the timing of transition of the set output from D-FF 118 in the last stage from the L level to the H level, the output signal from AND circuit 120 makes transition from the L level to the H level.

According to such a configuration, when error signal ERR continues to exhibit the H level over clock inputs as many as D-FFs 118 that make up shift register 116, shift register 116 provides a signal at the H level. In other words, when the communication error continues for a prescribed time period corresponding to a plurality of clock inputs, shift register 116 provides the signal at the H level.

RS-FF 124 receives an output signal from shift register 116 at a set input terminal S and receives clock CLK at a clock terminal. RS-FF 124 enters a set state when a set input is at the H level, and provides a signal at the H level to set output terminal Q. In other words, when a communication error in serial communication continues for a prescribed time period corresponding to a plurality of clock inputs, RS-FF 124 provides a signal at the H level. The signal at the H level provided from RS-FF 124 corresponds to a signal indicating abnormality in serial communication. The output signal from RS-FF 124 is provided to switch S1 and provided to clear input terminals CLR of D-FFs 121, 122, and 123. Switch S1 is turned off upon receiving a signal indicating abnormality in serial communication. A set output from each of D-FFs 121, 122, and 123 is set to the L level as it is reset by a clear input at the H level.

Thus, when abnormality in serial communication occurs, switch S1 is turned off to disconnect corresponding uninterruptible power supply apparatus U from the uninterruptible power supply system. Furthermore, transfer of a voltage command from check circuit 31 to correction circuits 32, 33, and 34 is stopped, so that converter 4, inverter 8, and bidirectional chopper 7 of corresponding uninterruptible power supply apparatus U are deactivated.

Referring back to FIG. 4, correction circuit 32 corrects voltage command value Vi* transferred from check circuit 31. As described with reference to FIG. 5, voltage command value Vi* is generated based on DC voltage average value Vda among the plurality of uninterruptible power supply apparatuses U1 to U3. Therefore, in each uninterruptible power supply apparatus U, voltage command value Vi* may contain an error originating from a difference between DC voltage average value Vda and actual DC voltage Vd. Correction circuit 32 corrects voltage command value Vi* in accordance with the detection value of DC voltage Vd to thereby match DC voltage Vd1 generated by converter 4 with reference voltage Vdr.

PWM circuit 35 generates a PWM signal for controlling AC input voltage Vi to voltage command value Vi* corrected by correction circuit 32. PWM circuit 35 obtains voltage command value Vi* standardized to a numeric value within a range from −1 to +1 by dividing voltage command value Vi* by DC voltage Vd1. PWM circuit 35 generates gate signals (PWM signals) A1 to A3 in accordance with voltage comparison between standardized voltage command value Vi* and a carrier wave CW that varies within the range from −1 to +1 at a constant frequency. The frequency of carrier wave CW matches with the switching frequency of IGBTs Q1 to Q6.

Deadtime generation circuit 38 generates gate signals B1 to B3 inverse in logic level to gate signals A1 to A3, upon receiving gate signals A1 to A3 generated by PWM circuit 35. Deadtime generation circuit 38 provides a deadtime Td during which both of gate signals to be paired are set to the L level, between gate signals A1 and B1, between gate signals A2 and B2, and gate signals A3 and B3. By providing deadtime Td, formation of a short-circuiting path due to simultaneous turn-on of an upper arm element and a lower arm element caused by variation between elements can be prevented.

Figure 7:
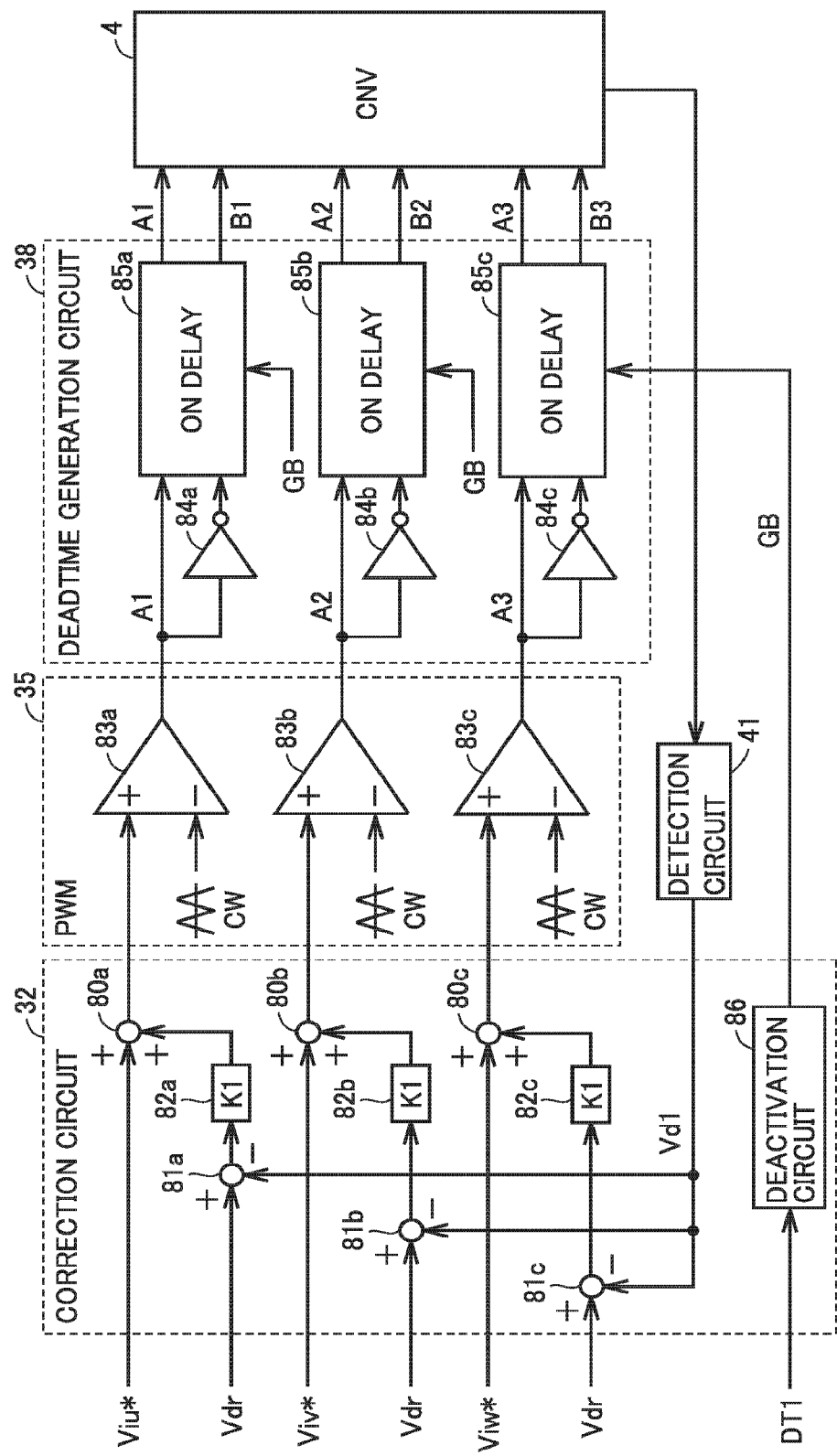
FIG. 7 is a functional block diagram illustrating an exemplary configuration of a correction circuit, a PWM circuit, and a deadtime generation circuit.

FIG. 7 is a functional block diagram illustrating an exemplary configuration of correction circuit 32, PWM circuit 35, and deadtime generation circuit 38.

Referring to FIG. 7, correction circuit 32 receives a voltage command value Viu* (a U-phase voltage command value Viu*, a V-phase voltage command value Viv*, and a W-phase voltage command value Viw*) and receives failure detection signal DT1 from failure detection circuit 44. Correction circuit 32 includes subtractors 81a to 81c, gain calculators 82a to 82c, and adders 80a to 80c.

Subtractor 81a calculates a difference $\Delta Vd1$ of DC voltage Vd1 from reference voltage Vdr ($\Delta Vd1 = Vdr - Vd1$). Gain calculator 82a multiplies difference $\Delta Vd1$ by a correction gain K1 and provides a result of multiplication to adder 80a. Adder 80a adds an output ($\Delta Vd1 \cdot K1$) from gain calculator 82a as a feedforward term to U-phase voltage command value Viu*.

Subtractor 81b calculates difference $\Delta Vd1$ of DC voltage Vd1 from reference voltage Vdr ($\Delta Vd1 = Vdr - Vd1$). Gain calculator 82b multiplies difference $\Delta Vd1$ by correction gain K1 and provides a result of multiplication to adder 80b. Adder 80b adds an output ($\Delta Vd1 \cdot K1$) from gain calculator 82b as a feedforward term to V-phase voltage command value Viv*.

Subtractor 81c calculates difference $\Delta Vd1$ of DC voltage Vd1 from reference voltage Vdr ($\Delta Vd1 = Vdr - Vd1$). Gain calculator 82c multiplies difference $\Delta Vd1$ by correction gain K1 and provides a result of multiplication to adder 80c.

Adder 80c adds an output ($\Delta Vd1 \cdot K1$) from gain calculator 82c as a feedforward term to W-phase voltage command value Viw*.

PWM circuit 35 includes comparators 83a to 83c. Each of voltage command values Viu*, Viv*, and Viw* from adders 80a to 80c is standardized to a numeric value within a range from −1 to +1 by being divided by DC voltage Vd1.

Comparator 83a generates gate signal A1 in accordance with voltage comparison between standardized U-phase voltage command value Viu* and carrier wave CW that varies between the range from −1 to +1 at the constant frequency. Comparator 83b generates gate signal A2 in accordance with voltage comparison between standardized V-phase voltage command value Viv* and carrier wave CW. Comparator 83c generates gate signal A3 in accordance with voltage comparison between standardized W-phase voltage command value Viw* and carrier wave CW.

Deadtime generation circuit 38 includes logical NOT (NOT) circuits 84a to 84c and on delay circuits 85a to 85c. NOT circuit 84a generates gate signal B1 by negation operation of gate signal A1. On delay circuit 85a provides deadtime Td to gate signals A1 and B1. Specifically, on delay circuit 85a provides a delay time as long as deadtime Td to gate signal A1 such that IGBT Q1 (the upper arm element) is turned on after IGBT Q2 (the lower arm element) is turned off. On delay circuit 85a provides a delay time as long as deadtime Td to gate signal B1 such that IGBT Q2 (the lower arm element) is turned on after IGBT Q1 (the upper arm element) is turned off. On delay circuit 85a provides gate signals A1 and B1 provided with deadtime Td to gates of IGBTs Q1 and Q4 of converter 4, respectively.

NOT circuit 84b generates gate signal B2 by negation operation of gate signal A2. On delay circuit 85b provides deadtime Td to gate signals A2 and B2. On delay circuit 85b provides gate signals A2 and B2 provided with deadtime Td to gates of IGBTs Q2 and Q5 of converter 4, respectively.

NOT circuit 84c generates gate signal B3 by negation operation of gate signal A3. On delay circuit 85c provides deadtime Td to gate signals A3 and B3. On delay circuit 85c provides gate signals A3 and B3 provided with deadtime Td to gates of IGBTs Q3 and Q6 of converter 4, respectively.

Correction circuit 32 further includes a deactivation circuit 86. When deactivation circuit 86 receives failure detection signal DT1 at the H level from failure detection circuit 44, it provides a gate cut-off command GB for cutting off the gates of IGBTs Q1 to Q6 of converter 4 to each of on delay circuits 85a to 85c of deadtime generation circuit 38. When uninterruptible power supply apparatus U1 fails, converter 4 of uninterruptible power supply apparatus U1 is thus set to a deactivated state.

Referring back to FIG. 4, correction circuit 33 corrects voltage command value Vd* transferred from check circuit 31. As described with reference to FIG. 5, voltage command value Vd* is generated based on DC voltage average value Vda among the plurality of uninterruptible power supply apparatuses U1 to U3. Therefore, in each uninterruptible power supply apparatus U, voltage command value Vd* may contain an error originating from a difference between DC voltage average value Vda and actual DC voltage Vd. Correction circuit 33 corrects voltage command value Vd* in accordance with a detection value of DC voltage Vd to thereby match DC voltage Vd1 generated by bidirectional chopper 7 with reference voltage Vdr.

PWM circuit 36 generates a PWM signal for controlling DC voltage Vd to voltage command value Vd* corrected by correction circuit 33. PWM circuit 36 obtains voltage command value Vd* standardized to a numeric value within a range from −1 to +1 by dividing voltage command value Vd* by DC voltage Vd1. PWM circuit 36 generates gate signal (PWM signal) G1 in accordance with voltage comparison between standardized voltage command value Vd* and carrier wave CW that varies within a range from −1 to +1 at the constant frequency.

When deadtime generation circuit 39 receives gate signal G1 generated by PWM circuit 36, it generates gate signal G2 inverse in logic level to gate signal G1. Deadtime generation circuit 39 provides deadtime Td between gate signals G1 and G2.

Figure 8:
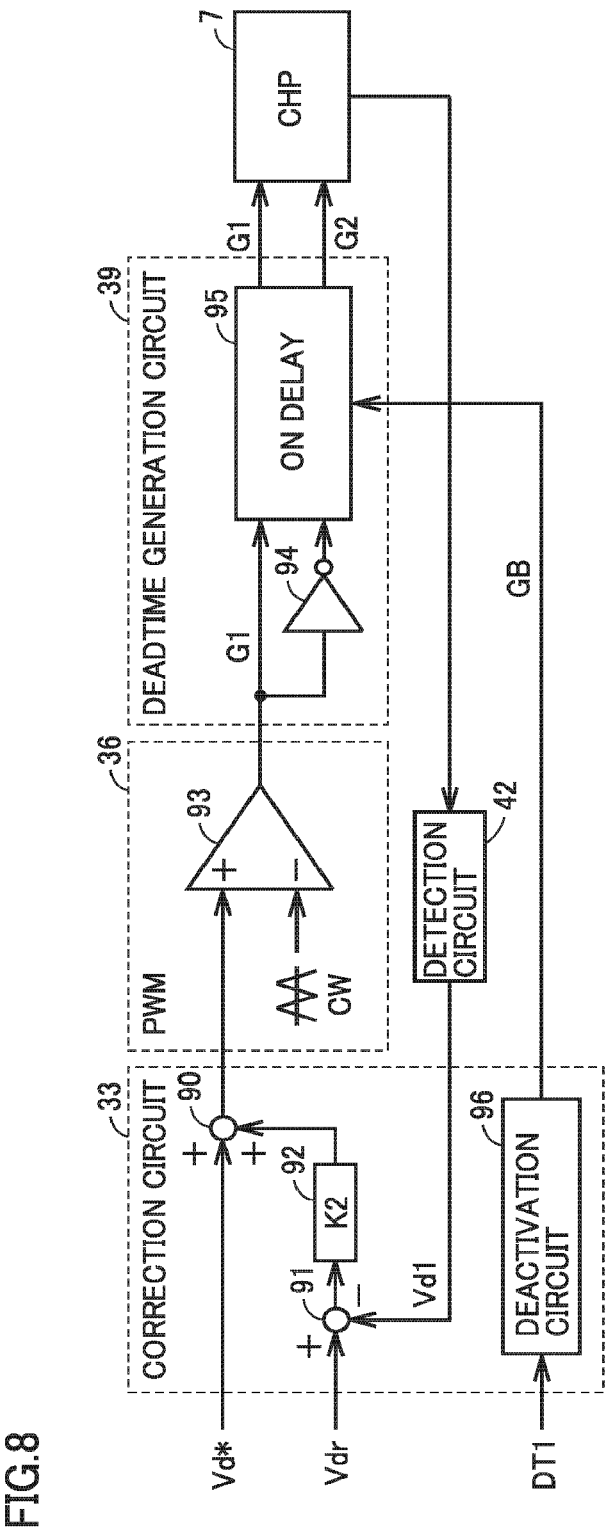
FIG. 8 is a functional block diagram illustrating an exemplary configuration of a correction circuit, a PWM circuit, and a deadtime generation circuit.

FIG. 8 is a functional block diagram illustrating an exemplary configuration of correction circuit 33, PWM circuit 36, and deadtime generation circuit 39.

Referring to FIG. 8, correction circuit 33 receives voltage command value Vd* and receives failure detection signal DT1 from failure detection circuit 44. Correction circuit 33 includes a subtractor 91, a gain calculator 92, and an adder 90.

Subtractor 91 calculates difference $\Delta Vd1$ of DC voltage Vd1 from reference voltage Vdr ($\Delta Vd1 = Vdr - Vd1$). Gain calculator 92 multiplies difference $\Delta Vd1$ by a correction gain K2 and provides a result of multiplication to adder 90. Adder 90 adds an output ($\Delta Vd1 \cdot K2$) from gain calculator 92 as a feedforward term to voltage command value Vd*.

PWM circuit 36 includes a comparator 93. Voltage command value Vd* from adder 90 is standardized to a numeric value within a range from −1 to +1 by being divided by DC voltage Vd1. Comparator 93 generates gate signal G1 in accordance with voltage comparison between standardized voltage command value Vd* and carrier wave CW.

Deadtime generation circuit 39 includes a NOT circuit 94 and an on delay circuit 95. NOT circuit 94 generates gate signal G2 by negation operation of gate signal G1. On delay circuit 95 provides deadtime Td to gate signals G1 and G2. On delay circuit 95 provides gate signals G1 and G2 provided with deadtime Td to gates of IGBTs Q21 and Q22 of bidirectional chopper 7, respectively.

Correction circuit 33 further includes a deactivation circuit 96. When deactivation circuit 96 receives failure detection signal DT1 at the H level from failure detection circuit 44, it provides gate cut-off command GB for cutting off the gates of IGBTs Q21 and Q22 of bidirectional chopper 7 to on delay circuit 95 of deadtime generation circuit 39. When uninterruptible power supply apparatus U1 fails, bidirectional chopper 7 of uninterruptible power supply apparatus U1 is thus set to the deactivated state.

Referring back to FIG. 4, correction circuit 34 corrects voltage command value Vo* transferred from check circuit 31. As described with reference to FIG. 5, voltage command value Vo* is generated based on output current average value boa among the plurality of uninterruptible power supply apparatuses U1 to U3. Therefore, in each uninterruptible power supply apparatus U, voltage command value Vo* may contain an error originating from a difference between output current average value boa and actual output current Io. Correction circuit 34 corrects voltage command value Vo* in accordance with a detection value of output current Io to thereby synchronize AC output voltage Vo generated by inverter 8 with an AC output voltage of commercial AC power supply 100.

PWM circuit 37 generates a PWM signal for controlling AC output voltage Vo to voltage command value Vo* corrected by correction circuit 34. PWM circuit 37 obtains voltage command value Vo* standardized to a numeric value within a range from −1 to +1 by dividing voltage command value Vo* by DC voltage Vd1. PWM circuit 37 generates gate signals (PWM signals) X1 to X3 in accordance with voltage comparison between standardized voltage command value Vo* and carrier wave CW.

When deadtime generation circuit 40 receives gate signals X1 to X3 generated by PWM circuit 37, it generates gate signals Y1 to Y3 inverse in logic level to gate signals X1 to X3. Deadtime generation circuit 40 provides deadtime Td between gate signals X1 and Y1, between gate signals X2 and Y2, and gate signals X3 and Y3.

Figure 9:
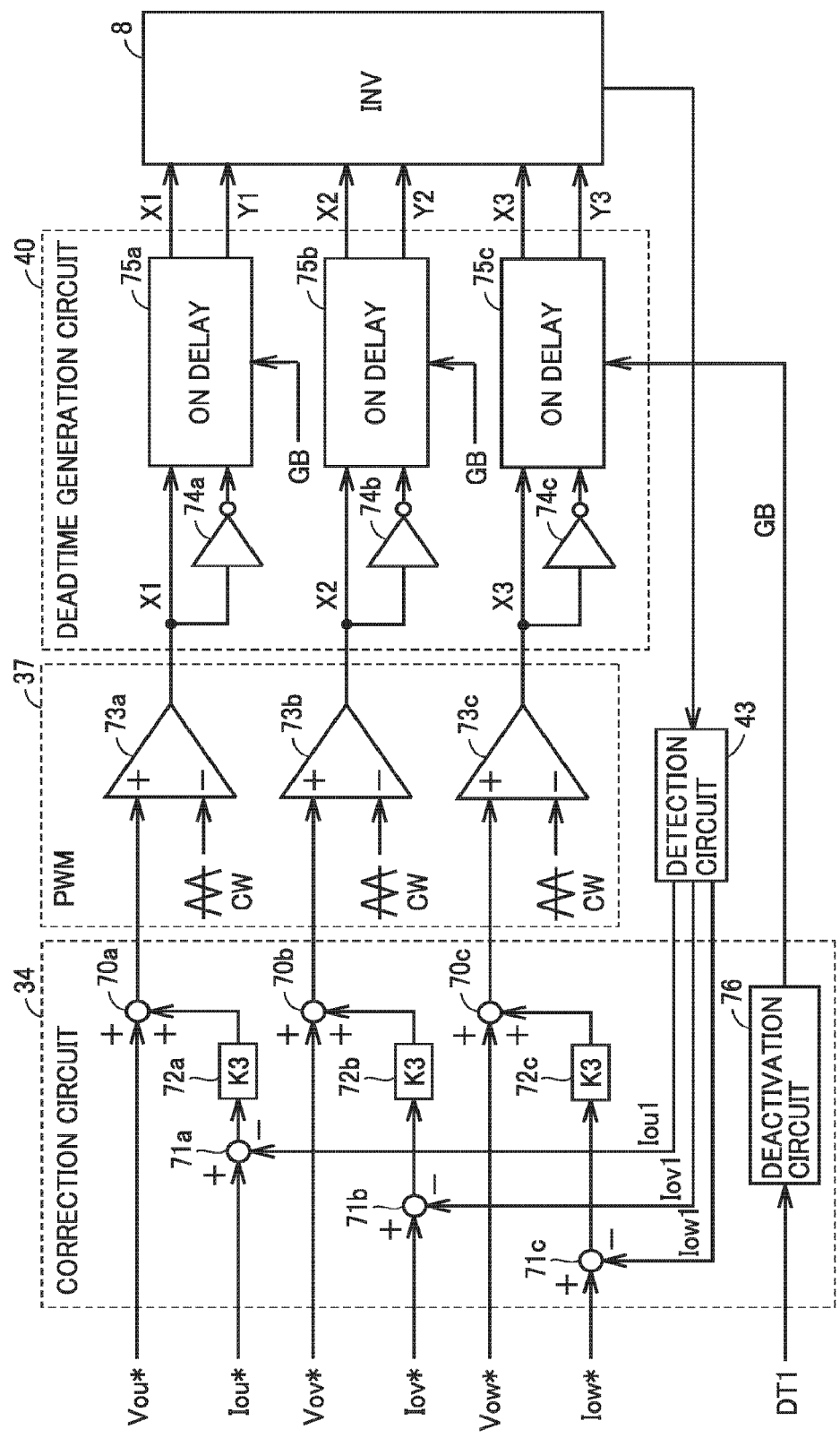
FIG. 9 is a functional block diagram illustrating an exemplary configuration of a correction circuit, a PWM circuit, and a deadtime generation circuit.

FIG. 9 is a functional block diagram illustrating an exemplary configuration of correction circuit 34, PWM circuit 37, and deadtime generation circuit 40.

Referring to FIG. 9, correction circuit 34 receives a voltage command value Vou* (a U-phase voltage command value Vou*, a V-phase voltage command value Vov*, and a W-phase voltage command value Vow*) and receives failure detection signal DT1 from failure detection circuit 44. Correction circuit 32 includes subtractors 71a to 71c, gain calculators 72a to 72c, and adders 70a to 70c.

Subtractor 71a calculates a difference ΔIou1 of a U-phase output current Iou1 from a U-phase current command value Iou* (ΔIou1=Iou*−Iou1). Gain calculator 72a multiplies difference ΔIou1 by a correction gain K3 and provides a result of multiplication to adder 70a. Adder 70a adds an output (ΔIou1·K3) from gain calculator 72a as a feedforward term to U-phase voltage command value Vou*.

Subtractor 71b calculates a difference ΔIov1 of a V-phase output current Iov1 from a V-phase current command value Iov* (ΔIov1=Iov*−Iov1). Gain calculator 72b multiplies difference ΔIov1 by correction gain K3 and provides a result of multiplication to adder 70b. Adder 70b adds an output (ΔIov1·K3) from gain calculator 72b as a feedforward term to V-phase voltage command value Vov*.

Subtractor 71c calculates a difference ΔIow1 of a W-phase output current Iow1 from a W-phase current command value Iow* (ΔIow1=Iow*−Iow1). Gain calculator 72c multiplies difference ΔIow1 by correction gain K3 and provides a result of multiplication to adder 70c. Adder 70c adds an output (ΔIow1·K3) from gain calculator 72c as a feedforward term to W-phase voltage command value Vow*.

PWM circuit 37 includes comparators 73a to 73c. Each of voltage command values Vou*, Vov*, and Vow* from adders 70a to 70c is standardized to a numeric value within a range from −1 to +1 by being divided by DC voltage Vd1.

Comparator 73a generates gate signal X1 in accordance with voltage comparison between standardized U-phase voltage command value Vou* and carrier wave CW. Comparator 73b generates gate signal X2 in accordance with voltage comparison between standardized V-phase voltage command value Vov* and carrier wave CW. Comparator 73c generates gate signal X3 in accordance with voltage comparison between standardized W-phase voltage command value Vow* and carrier wave CW.

Deadtime generation circuit 40 includes NOT circuits 74a to 74c and on delay circuits 75a to 75c. NOT circuit 74a generates gate signal Y1 by negation operation of gate signal X1. On delay circuit 75a provides deadtime Td to gate signals X1 and Y1. On delay circuit 75a provides gate signals X1 and Y1 provided with deadtime Td to gates of IGBTs Q11 and Q14 of inverter 8, respectively.

NOT circuit 74b generates gate signal Y2 by negation operation of gate signal X2. On delay circuit 75b provides deadtime Td to gate signals X2 and Y2. On delay circuit 75b provides gate signals X2 and Y2 provided with deadtime Td to gates of IGBTs Q12 and Q15 of inverter 8, respectively.

NOT circuit 74c generates gate signal Y3 by negation operation of gate signal X3. On delay circuit 75c provides deadtime Td to gate signals X3 and Y3. On delay circuit 75c provides gate signals X3 and Y3 provided with deadtime Td to gates of IGBTs Q13 and Q16 of inverter 8, respectively.

Correction circuit 34 further includes a deactivation circuit 76. When deactivation circuit 76 receives failure detection signal DT1 at the H level from failure detection circuit 44, it provides gate cut-off command GB for cutting of gates of IGBTs Q11 to Q16 of inverter 8 to each of on delay circuits 75a to 75c of deadtime generation circuit 40. When uninterruptible power supply apparatus U1 fails, inverter 8 of uninterruptible power supply apparatus U1 is thus set to the deactivated state.

As described above, the uninterruptible power supply system according to the present embodiment is configured such that the master controller (control device 20) that controls a plurality of uninterruptible power supply apparatuses in a centralized manner generates a voltage command common to the plurality of uninterruptible power supply apparatuses and transmits the voltage command to the slave controller (control circuit 15) of each uninterruptible power supply apparatus and each slave controller generates a control signal (gate signal) for controlling a power converter of the corresponding uninterruptible power supply apparatus in accordance with the received voltage command.

According to the configuration, even when noise is generated in communication between the master controller and each slave controller, each slave controller can generate the control signal in a stable manner. Therefore, as compared with a configuration in which the master controller generates a control signal based on a voltage command and transmits the control signal to each slave controller and each slave controller controls the power converter of the corresponding uninterruptible power supply apparatus with the received control signal, the control signal can be stabilized. Consequently, each uninterruptible power supply apparatus can operate in a stable manner.

In the present embodiment, the master controller transmits a voltage command to each slave controller by serial communication Therefore, increase in number of communication cables disposed between the master controller and each slave controller can be suppressed.

According to the present embodiment, each slave controller checks whether or not a communication error has occurred in serial communication, and when a communication error occurs, each slave control holds a previous voltage command value. Therefore, even when a communication error occurs, each slave controller can generate a control signal in a stable manner.

When communication abnormality that disables serial communication occurs, each slave controller disconnects the corresponding uninterruptible power supply apparatus from the uninterruptible power supply system, so that a malfunction of the corresponding uninterruptible power supply apparatus caused by difficulty in reception of a voltage command can be suppressed.

Furthermore, in the present embodiment, each slave controller detects failure of the corresponding uninterruptible power supply apparatus and stops operation of the power converter. Therefore, as compared with a configuration in which the master controller detects failure based on current and voltage detection values transmitted from each uninterruptible power supply apparatus and transmits an operation stop command to the failed uninterruptible power supply apparatus, failure of the uninterruptible power supply apparatus can more quickly be detected and the failed uninterruptible power supply apparatus can promptly be deactivated.

In the present embodiment, each slave controller provides a deadtime to a control signal for the power converter. Therefore, instability of the control signal due to a communication error and resultant formation of a short-circuiting path due to simultaneous turn-on of the upper arm element and the lower arm element in the power converter can be prevented.

Furthermore, according to the present embodiment, since the master controller is configured to supply control power supply to each slave controller, installation of a circuit that generates control power supply in each uninterruptible power supply apparatus is not required.

(Other Exemplary Configurations)

In the embodiment above, an exemplary configuration in which control device 20 that implements the "master controller" that controls the plurality of uninterruptible power supply apparatuses U1 to U3 in a centralized manner is separate from control circuit 15 of uninterruptible power supply apparatus U that implements the "slave controller" is described. According to this exemplary configuration, in increasing or decreasing the number of uninterruptible power supply apparatuses U connected in parallel, the control configuration of the entire system can readily be modified.

Alternatively, instead of the exemplary configuration, the "master controller" and the "slave controller" can also be integrated in control circuit 15 of any one uninterruptible power supply apparatus U of the plurality of uninterruptible power supply apparatuses U1 to U3. According to this exemplary configuration, the master controller does not have to newly be installed. Therefore, the uninterruptible power supply system can be simplified. Even when uninterruptible power supply apparatus U set as the master controller is disconnected from the uninterruptible power supply system, control circuit 15 can control a remaining normal uninterruptible power supply apparatus U by supplying and receiving data to and from control circuit 15 of normal uninterruptible power supply apparatus U.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

REFERENCE SIGNS LIST 1, 5, 10, 702 capacitor; 2, 9, 700 reactor; 3 AC input filter; 4 converter; 6 DC line; 7 bidirectional chopper; 8 inverter; 11 AC output filter; 12, 13, 14 current detector; 15 control circuit; 16 communication cable; 17 power cable; 20 control device; 21, 30 serial communication I/F; 22, 22A to 22H average value calculator; 23, 23A to 23C voltage command generator; 24, 45 control power supply; 25 control power supply generator; 31 check circuit; 32 to 34 correction circuit; 35 to 37 PWM circuit; 72a to 74c, 84a to 84c, 94, 112 NOT circuit; 38 to 40 deadtime generation circuit; 41 to 43 detection circuit; 44 failure detection circuit; 50, 53, 55, 57, 60, 62, 71a to 71c, 81a to 81c, 91 subtractor; 51, 56, 61 voltage controller; 52 parallel controller; 54, 58, 63 current controller; 59, 70a to 70c, 80a to 80c, 90 adder; 72a to 72c, 82a to 82c, 92 gain calculator; 73a to 73c, 83a to 83c, 93 comparator; 75a to 75c, 85a to 85c, 95 on delay circuit; 76, 86, 96 deactivation circuit; 100 commercial AC power supply; 102 load; 110 serial communication checker; 116 shift register; B1 to B3 battery; T1 input terminal; DT1 to DT3 failure detection signal; ERR error signal; S1 to S3 switch; T2 battery terminal; T3 output terminal; U, U1 to U3 uninterruptible power supply apparatus

The invention claimed is:

1. An uninterruptible power supply system comprising:
a plurality of uninterruptible power supply apparatuses connected in parallel to a load; and
a master controller that controls the plurality of uninterruptible power supply apparatuses,
each of the plurality of uninterruptible power supply apparatuses including:
  a converter that converts AC power supplied from an AC power supply to DC power,
  an inverter that converts DC power supplied from the converter or a power storage device to AC power and supplies AC power to the load,
  a detection circuit that detects at least a DC input voltage to the inverter, an AC output voltage from the inverter, and an output current from the inverter, and
  a slave controller communicatively connected to the master controller, the slave controller controlling the converter and the inverter; wherein
the master controller generates a first voltage command value and a second voltage command value common to the plurality of uninterruptible power supply apparatuses based on a detection value from the detection circuit transmitted from the slave controller of each of the plurality of uninterruptible power supply apparatuses, and transmits the generated first and second voltage command values to the slave controller of each of the plurality of uninterruptible power supply apparatuses, and
the slave controller generates a first control signal for controlling the converter in accordance with the received first voltage command value, and generates a second control signal for controlling the inverter in accordance with the received second voltage command value, wherein
the master controller calculates a first average value by averaging detection values of the DC input voltages in the plurality of uninterruptible power supply apparatuses, and generates the first voltage command value such that the first average value follows a first target value, and
the slave controller corrects the first voltage command value in accordance with a difference of the detection value of the DC input voltage in a corresponding uninterruptible power supply apparatus from the first target value, and generates the first control signal based on the corrected first voltage command value.

2. The uninterruptible power supply system according to claim 1, wherein
the convener includes first and second semiconductor switching elements that are connected in series to each other and complementarily turned on and off in response to the first control signal, and
the slave controller provides a deadtime for simultaneously turning off the first and second semiconductor switching elements to the first control signal.

3. An uninterruptible power supply system comprising:
a plurality of uninterruptible power supply apparatuses connected in parallel to a load; and
a master controller that controls the plurality of uninterruptible power supply apparatuses,
each of the plurality of uninterruptible power supply apparatuses including:
  a converter that converts AC power supplied from an AC power supply to DC power, an inverter that converts DC power supplied from the converter or a power storage device to AC power and supplies AC power to the load, a detection circuit that detects at least a DC input voltage to the inverter, an AC output voltage from the inverter, and an output current from the inverter, and a slave controller communicatively connected to the master controller, the slave controller controlling the converter and the inverter; wherein the master controller generates a first voltage command value and a second voltage command value common to the plurality of uninterruptible power supply apparatuses based on a detection value from the detection circuit transmitted from the slave controller of each of the plurality of uninterruptible power supply apparatuses, and transmits the generated first and second voltage command values to the slave controller of each of the plurality of uninterruptible power supply apparatuses, and the slave controller generates a first control signal for controlling the converter in accordance with the received first voltage command value, and generates a second control signal for controlling the inverter in accordance with the received second voltage command value, wherein the master controller calculates a second average value by averaging detection values of the output currents in the plurality of uninterruptible power supply apparatuses, and generates the second voltage command value such that the second average value follows a second target value, and the slave controller corrects the second voltage command value in accordance with a difference of the detection value of the output current in a corresponding uninterruptible power supply apparatus from the second target value, and generates the second control signal based on the corrected second voltage command value.

4. The uninterruptible power supply system according to claim 3, wherein the inverter includes third and fourth semiconductor switching elements that are connected in series to each other and complementarily turned on and off in response to the second control signal, and the slave controller provides a deadtime for simultaneously turning off the third and fourth semiconductor switching elements to the second control signal.

5. An uninterruptible power supply system comprising:

a plurality of uninterruptible power supply apparatuses connected in parallel to a load; and a master controller that controls the plurality of uninterruptible power supply apparatuses, each of the plurality of uninterruptable power supply apparatuses including:

a converter that converts AC power supplied from an AC power supply to DC power, an inverter that converts DC power supplied from the converter or a power storage device to AC power and supplies AC power to the load, a detection circuit that detects at least a DC input voltage to the inverter, an AC output voltage from the inverter, and an output current from the inverter, and a slave controller communicatively connected to the master controller, the slave controller controlling the converter and the inverter; wherein the master controller generates a first voltage command value and a second voltage command value common to the plurality of uninterruptible power supply apparatuses based on a detection value from the detection circuit transmitted from the slave controller of each of the plurality of uninterruptible power supply apparatuses, and transmits the generated first and second voltage command values to the slave controller of each of the plurality of uninterruptible power supply apparatuses, and the slave controller generates a first control signal for controlling the converter in accordance with the received first voltage command value, and generates a second control signal for controlling the inverter in accordance with the received second voltage command value, wherein each of the plurality of uninterruptible power supply apparatuses further includes a DC line connected between the converter and the inverter, and a bidirectional chopper that supplies and receives DC power between the power storage device and the DC line, the master controller generates a third voltage command value common to the plurality of uninterruptible power supply apparatuses based on the detection value from the detection circuit transmitted from the slave controller of each of the plurality of uninterruptible power supply apparatuses, and transmits the generated third voltage command value to the slave controller of each of the plurality of uninterruptible power supply apparatuses, and the slave controller generates a third control signal for controlling the bidirectional chopper in accordance with the received third voltage command value.

6. The uninterruptible power supply system according to claim 5, wherein the master controller calculates a third average value by averaging detection values of the DC input voltages in the plurality of uninterruptible power supply apparatuses, and generates the third voltage command value such that the third average value follows a third target value, and the slave controller corrects the third voltage command value in accordance with a difference of the detection value of the DC input voltage in a corresponding uninterruptible power supply apparatus from the third target value, and generates the third control signal based on the corrected third voltage command value.

7. The uninterruptible power supply system according to claim 6, wherein the bidirectional chopper includes fifth and sixth semiconductor switching elements that are connected in series to each other and complementarily turned on and off in response to the third control signal, and the slave controller provides a deadtime for simultaneously turning off the fifth and sixth semiconductor switching elements to the third control signal.

8. The uninterruptible power supply system according to claim 1, wherein the master controller and each of the slave controller further includes a communication unit that transmits and receives data by serial communication.

9. An uninterruptible power supply system comprising:

a plurality of uninterruptible power supply apparatuses connected in parallel to a load; and a master controller that controls the plurality of uninterruptible power supply apparatuses, each of the plurality of uninterruptible power supply apparatuses including:

a converter that converts AC power supplied from an AC power supply to DC power, an inverter that converts DC power supplied from the converter or a power storage device to AC power and supplies AC power to the load, a detection circuit that detects at least a DC input voltage to the inverter, an AC output voltage from the inverter, and an output current from the inverter, and a slave controller communicatively connected to the master controller, the slave controller controlling the converter and the inverter: wherein the master controller generates a first voltage command value and a second voltage command value common to the plurality of uninterruptible power supply apparatuses based on a detection value from the detection circuit transmitted from the slave controller of each of the plurality of uninterruptible power supply apparatuses, and transmits the generated first and second voltage command values to the slave controller of each of the plurality of uninterruptible power supply apparatuses, and the slave controller generates a first control signal for controlling the converter in accordance with the received first voltage command value, and generates a second control signal for controlling the inverter in accordance with the received second voltage command value, the master controller and each of the slave controller further includes a communication unit that transmits and receives data by serial communication, the slave controller further includes a check circuit that senses a communication error in the serial communication, and when the check circuit senses the communication error, the slave controller holds previous first and second voltage command values, wherein when the check circuit senses the communication error continuously for a prescribed period, the slave controller disconnects a corresponding uninterruptible power supply apparatus from the uninterruptible power supply system.

10. The uninterruptible power supply system according to claim 1, wherein the slave controller stops operation of the converter and the inverter when a corresponding uninterruptible power supply apparatus fails.

11. The uninterruptible power supply system according to claim 3, wherein when the corresponding uninterruptible power supply apparatus fails, the slave controller stops operation of the converter and the inverter, and transmits a failure detection signal to the master controller, and the master controller determines the second target value based on currents to be allocated to uninterruptible power supply apparatuses other than a failed uninterruptible power supply apparatus among the plurality of uninterruptible power supply apparatuses.

12. The uninterruptible power supply system according to claim 1, further comprising a power cable for supplying control power supply from the master controller to the slave controller of each of the plurality of uninterruptible power supply apparatuses.

13. The uninterruptible power supply system according to claim 1, wherein the master controller is separate from the plurality of uninterruptible power supply apparatuses.

14. The uninterruptible power supply system according to claim 1, wherein the master controller is integrated with the slave controller of any one of the plurality of uninterruptible power supply apparatuses.

* * * * *